(12) United States Patent
Fragoso Iñiguez et al.

(10) Patent No.: US 11,912,108 B2
(45) Date of Patent: Feb. 27, 2024

(54) VEHICLE AIR VENT SYSTEM

(71) Applicant: Ford Global Technologies, LLC, Dearborn, MI (US)

(72) Inventors: Marcos Ahuizotl Fragoso Iñiguez, Neza (MX); Fernando Mayorga Basilio, Gustavo A. Madero (MX); Juan Pablo Jiménez de la Rosa, Coyoacan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 17/118,895

(22) Filed: Dec. 11, 2020

(65) Prior Publication Data
US 2022/0185074 A1 Jun. 16, 2022

(51) Int. Cl.
*B60H 1/34* (2006.01)
*B60H 1/00* (2006.01)

(52) U.S. Cl.
CPC ....... *B60H 1/3428* (2013.01); *B60H 1/00564* (2013.01); *B60H 1/00871* (2013.01); *B60H 1/00985* (2013.01); *B60H 2001/3471* (2013.01)

(58) Field of Classification Search
CPC ............. B60H 1/3428; B60H 1/00564; B60H 1/00871; B60H 1/00985; B60H 2001/3471; B60H 1/00207; B60H 1/00664; B60H 1/3414; B60H 1/34; F24F 11/52; F24F 13/14; F24F 13/15
USPC ....................................................... 454/155
See application file for complete search history.

(56) References Cited

U.S. PATENT DOCUMENTS

| | | | |
|---|---|---|---|
| 4,625,329 A | 11/1986 | Ishikawa et al. | |
| 6,932,695 B1 * | 8/2005 | Zielinski | B60H 1/3428 454/143 |
| 7,788,008 B2 | 8/2010 | Breed | |
| 9,555,692 B2 | 1/2017 | Shibata et al. | |
| 9,758,042 B2 | 9/2017 | Pryor | |
| 9,862,247 B2 | 1/2018 | Perkins | |
| 2002/0025774 A1 * | 2/2002 | Yamaguchi | B60H 1/3428 454/155 |
| 2005/0046377 A1 | 3/2005 | Hoyle | |
| 2009/0318069 A1 | 12/2009 | Konet | |
| 2010/0120347 A1 | 5/2010 | Gehring et al. | |

(Continued)

FOREIGN PATENT DOCUMENTS

| | | | |
|---|---|---|---|
| JP | S641133 U | * | 1/1989 |
| JP | 2008195221 | | 8/2008 |

(Continued)

*Primary Examiner* — Allen R. B. Schult
*Assistant Examiner* — William C Weinert
(74) *Attorney, Agent, or Firm* — Vichit Chea; Price Heneveld LLP

(57) ABSTRACT

A vehicle air vent system includes a duct defining an outlet that directs air into an interior compartment. An air register assembly is operably coupled to the duct proximate to the outlet. The air register assembly includes a frame. A vane is rotatably coupled to the frame. A variable resistor is operably coupled to the frame. A user interface has a display. A controller is communicatively coupled to the user interface and the variable resistor. The controller receives a signal from the variable resistor and determines a position of the air register assembly in response to the signal.

20 Claims, 10 Drawing Sheets

(56) References Cited

U.S. PATENT DOCUMENTS

| | | | |
|---|---|---|---|
| 2010/0330894 A1* | 12/2010 | Alexander | B60H 1/241 454/162 |
| 2013/0199826 A1* | 8/2013 | Britton | H05K 3/4015 174/251 |
| 2014/0326794 A1* | 11/2014 | Frank | F24F 11/523 236/51 |
| 2015/0094861 A1 | 4/2015 | Choi et al. | |
| 2018/0170149 A1* | 6/2018 | Fidh | B60H 1/3421 |
| 2018/0208017 A1 | 7/2018 | Hernandez et al. | |
| 2019/0176837 A1 | 6/2019 | Williams et al. | |
| 2019/0366801 A1* | 12/2019 | Nakashima | B60H 1/00842 |
| 2020/0009944 A1 | 1/2020 | Wilhelmsson | |
| 2020/0148033 A1* | 5/2020 | Skapof | B60K 35/00 |
| 2020/0164722 A1* | 5/2020 | Baker | B60H 1/3428 |
| 2020/0207263 A1* | 7/2020 | Kim | B60Q 3/85 |
| 2020/0376932 A1* | 12/2020 | nieto | B60H 1/3428 |
| 2021/0396387 A1* | 12/2021 | Apelt | G10K 15/04 |

FOREIGN PATENT DOCUMENTS

| | | |
|---|---|---|
| JP | 5805974 | 11/2015 |
| KR | 20090019352 A | 2/2009 |

\* cited by examiner

VEHICLE AIR VENT SYSTEM

FIELD OF THE DISCLOSURE

The present disclosure generally relates to an air vent system. More specifically, the present disclosure relates to an air vent system for a vehicle.

BACKGROUND OF THE DISCLOSURE

Vehicles often include air vents for directing air to passengers within the vehicle. Vents typically direct air from a heating, ventilation, and air conditioning system. The vents may be adjustable to change the direction of airflow through the vents.

SUMMARY OF THE DISCLOSURE

According to at least one aspect of the present disclosure, a vehicle air vent system includes a duct defining an outlet that directs air into an interior compartment. An air register assembly is operably coupled to the duct proximate to the outlet. The air register assembly includes a frame. A vane is rotatably coupled to the frame. A variable resistor is operably coupled to the frame. A user interface has a display. A controller is communicatively coupled to the user interface and the variable resistor. The controller receives a signal from the variable resistor and determines a position of the air register assembly in response to the signal.

According to another aspect of the present disclosure, an air register assembly includes a frame having a first side and a second side opposing the first side. The frame is operable between a first position and a second position. At least one vane extends between a third side of the frame and a fourth side of the frame. The third and fourth sides extend between the first and second sides. A shaft is coupled to the second side of the frame. The shaft extends away from the first side of the frame. A variable resistor is operably coupled to the frame. A movable terminal of the variable resistor is coupled to the shaft. A current measured by the variable resistor is adjusted as the frame moves between the first and second positions.

According to another aspect of the present disclosure, an air register assembly includes a frame having a first side and a second side. The frame is operable between a first position and a second position. A vane is rotatably coupled to a third side of the frame and a fourth side of the frame. The vane includes a projection that extends through the frame. A vane position indicator is coupled to the projection. The vane position indicator rotates within rotation of the vane. A frame position indicator is coupled to the frame. The frame position indicator adjusts with the frame as the frame moves between the first and second positions.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
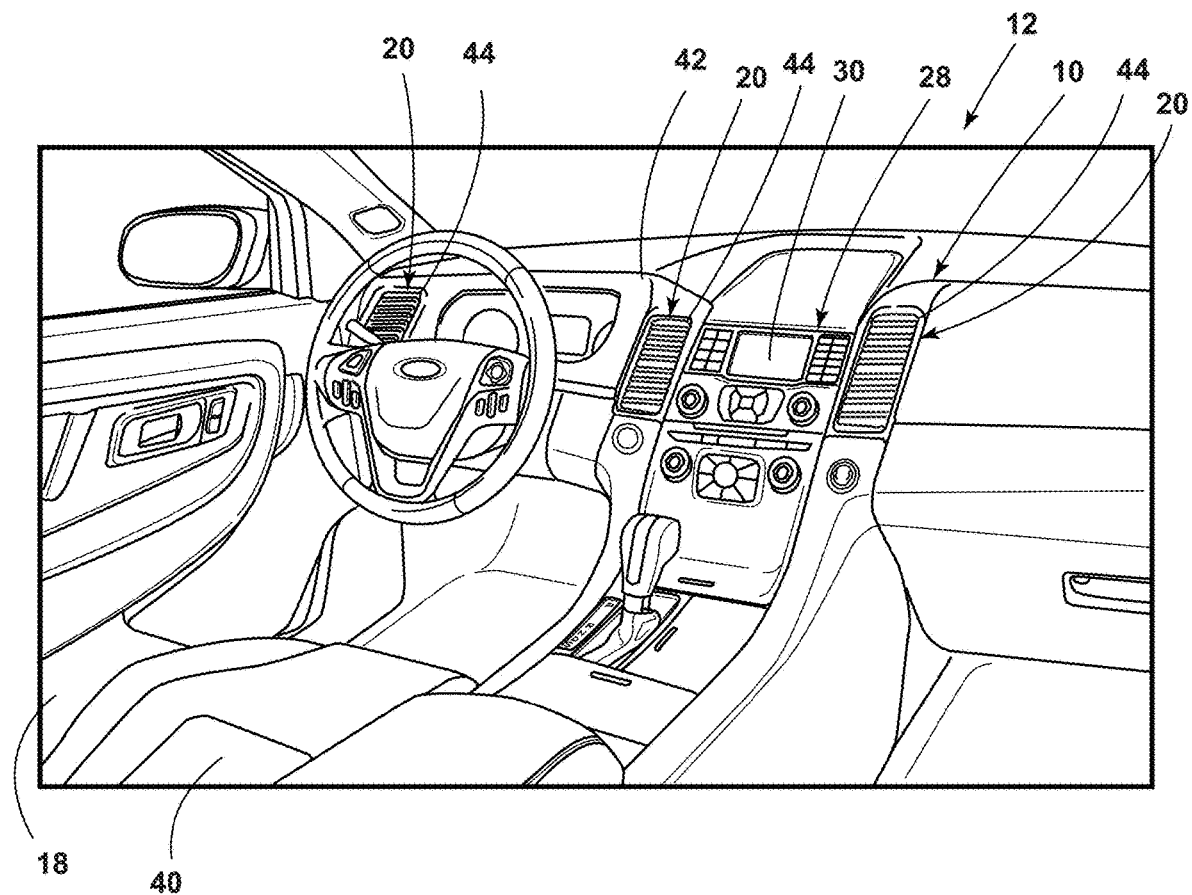
FIG. 1 is a partial front perspective view of a dashboard within an interior compartment of a vehicle having an air vent system, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-14, reference numeral 10 generally designates an air vent system for a vehicle 12. A duct 14 defines an outlet 16 that directs air into an interior compartment 18. An air register assembly 20 is operably coupled to the duct 14 proximate to the outlet 16. The air register assembly 20 includes a frame 22, a vane 24 rotatably coupled to the frame 22, and a variable resistor 26 operably coupled to the frame 22. A user interface 28 has a display 30. A controller is communicatively coupled to the user interface 28 and the variable resistor 26. The controller 32 receives a signal from the variable resistor 26 and determines a position of the air register assembly 20 in response to the signal.

The vehicle 12 includes the interior compartment 18, which includes seating assemblies 40 for supporting passengers of the vehicle 12. An instrument panel or dashboard 42 extends a cross-car direction in a vehicle-forward portion of the interior compartment 18 proximate to the seating assemblies 40. The dashboard 42 is generally a panel component constructed of plastic materials. The dashboard 42 defines air vent openings 44. The outlet 16 of the duct 14 generally aligns with the air vent openings 44 to fluidly couple the interior compartment 18 with a heating, ventilation, and air conditioning (HVAC) system for the vehicle 12. The vehicle 12 generally includes multiple air register assemblies 20, with at least one air register assembly 20 disposed in each air vent opening 44 to direct airflow from the HVAC system to the interior compartment 18. The HVAC system generally cleans, cools, heats, regulates, ventilates, and/or dehumidifies air directed into the interior compartment 18. The passenger or other user within the vehicle 12 may utilize the air register assembly 20 to direct air in a certain location or a certain direction to increase the comfort of the passenger.

The vehicle 12 may be a sedan, a sport utility vehicle, a van, a truck, a crossover, other styles of wheeled motor vehicles 12, or other types of vehicles 12. The vehicle 12 may be a manually operated vehicle 12 (e.g., with a human driver), a fully autonomous vehicle 12 (e.g., with no human driver), or a partially autonomous vehicle 12 (e.g., operated with or without a human driver). Additionally, the vehicle 12 may be utilized for personal and/or commercial purposes, such as, for ride providing services (e.g., chauffeuring) and/or ride-sharing services.

Figure 2:
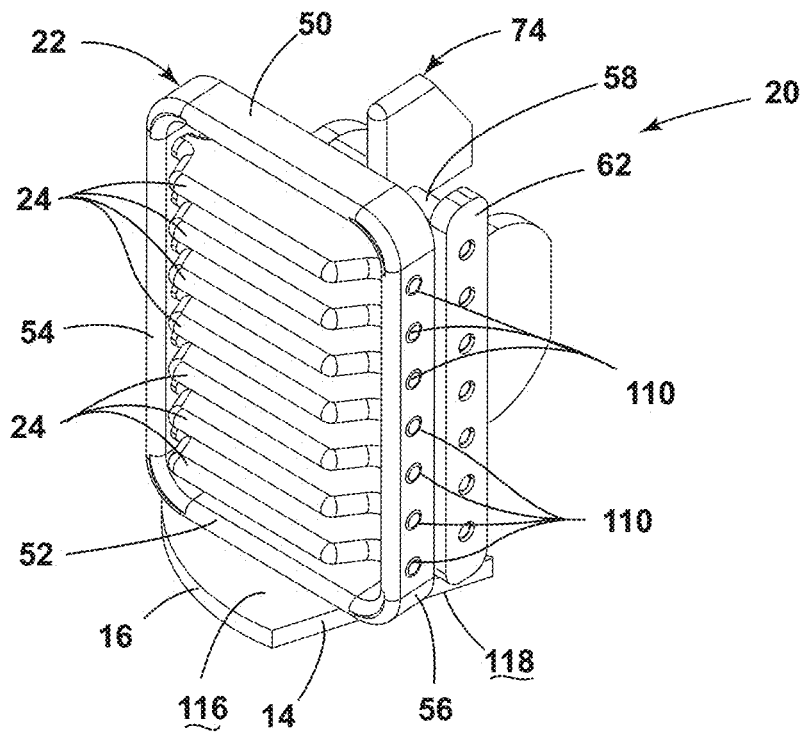
FIG. 2 is a front perspective view of an air register assembly with a portion of a duct, according to the present disclosure.
Figure 8:
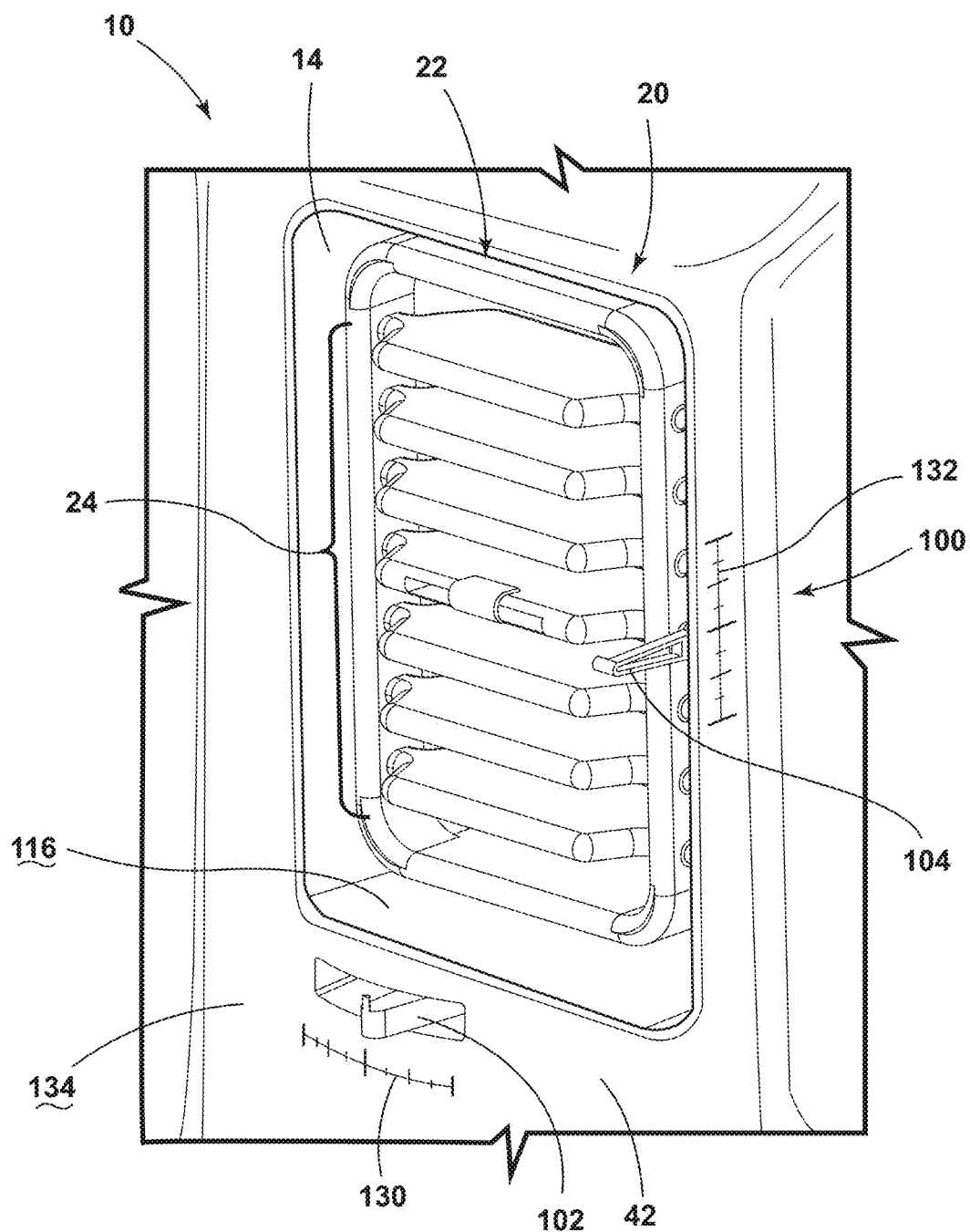
FIG. 8 is a front perspective view of an air register assembly with a position indicator assembly, where the air register assembly is disposed within a duct, according to the present disclosure.

Referring to FIGS. 1 and 2, the air register assembly 20 is disposed at least partially within the duct 14 proximate the outlet 16. A portion of the duct 14 is illustrated in FIG. 2 proximate a bottom of the air register assembly 20. The portion of the duct 14 is illustrated to show the interaction between the duct 14 and the air register assembly 20. However, it is understood that the duct 14 extends around the air register assembly, as best illustrated in FIG. 8. Referring still to FIGS. 1 and 2, the duct 14 may extend downstream of the air register assembly 20 (e.g., into the interior compartment 18). Accordingly, the air register assembly 20 may be setback from the outlet 16, which may provide space for movement of the air register assembly 20.

The air register assembly 20 rotates between a first position and a second position relative to the duct 14. During rotation, the air register assembly 20 may extend beyond the outlet 16 of the duct 14 into the interior compartment 18, or alternatively and may not substantially extend beyond the outlet 16. The air register assembly 20 rotates about a central vertical axis to direct air in various cross-car directions. For example, when the air register assembly 20 is in the first position, the air may be directed in a first cross-car direction (e.g., toward a driver side), and when the air register assembly 20 is positioned in the second position, the air may be directed in an opposing, second cross-car direction (e.g., toward a passenger side). The position of the air register assembly 20, and consequently a direction of the airflow extending through the air register assembly 20, may be manually adjusted by the passenger within the vehicle 12. The passenger may apply a force to the air register assembly 20, allowing the air register assembly 20 to rotate about the vertical axis between the first and second positions.

Referring still to FIG. 2, the air register assembly 20 includes the frame 22, which has a first side 50 arranged generally parallel with the second side 52, and a third side 54 arranged generally parallel to a fourth side 56. The third and fourth sides 54, 56 extend between the first and second sides 50, 52. Corners between each of the first side 50, the second side 52, the third side 54, and the fourth side 56, respectively, are generally rounded, which may assist in smoother rotation of the frame 22 between the first and second positions.

The air register assembly 20 generally includes multiple (e.g., a plurality of) vanes 24 arranged in a parallel configuration. The vanes 24 extend between and are rotatably coupled to the third and fourth sides 54, 56 of the frame 22. Generally, the vanes 24 extend horizontally. Each vane 24 includes a coupling projection 58 that extends upstream of and proximate to the fourth side 56 of the frame 22. It is contemplated that the coupling projection 58 may be disposed proximate the third side 54 of the frame 22 without departing from the teachings herein. The air register assembly 20 includes a link bar 62 that is disposed upstream of and adjacent to the fourth side 56 of the frame 22. The link bar 62 couples the vanes 24 to one another. In this way, when the user engages at least one of the vanes 24, all of the vanes 24 are rotated simultaneously. The vanes 24 are operable between a first angle and a second angle, which vertically adjusts the airflow extending through the air register assembly 20. Accordingly, the frame 22 is adjustable between the first and second positions to adjust the airflow in the cross-car direction, and the vanes 24 are adjustable between the first angle and the second angle to adjust the height of the airflow.

Figure 3:
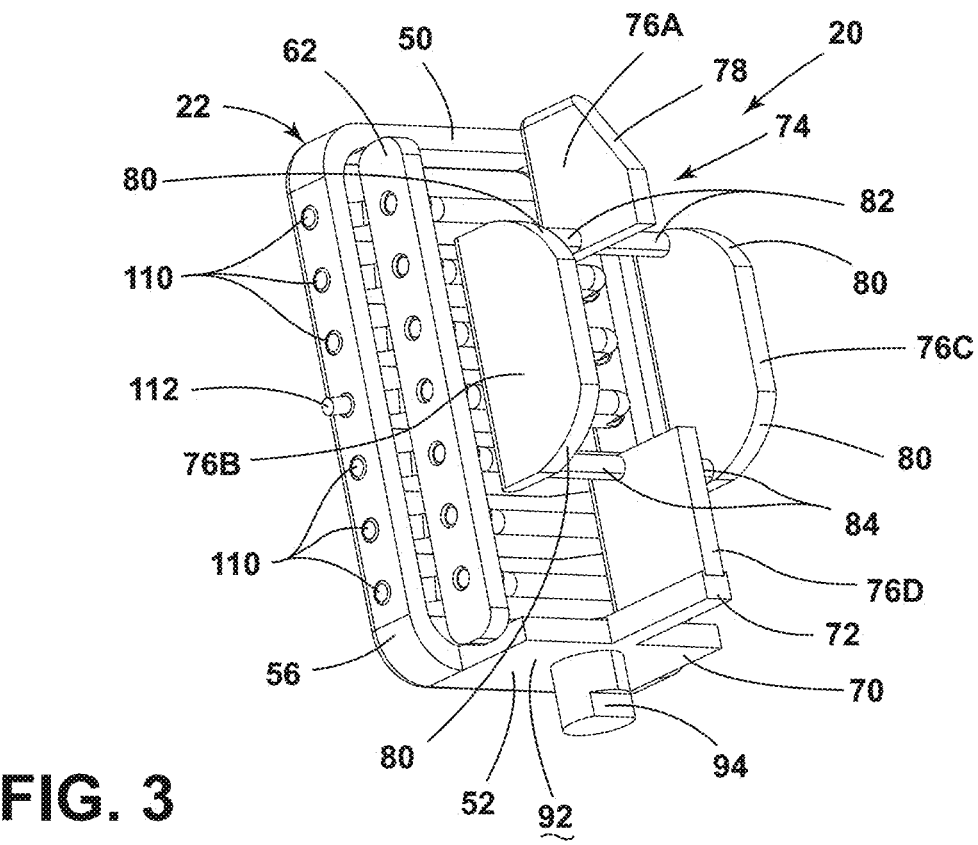
FIG. 3 is a rear perspective view of an air register assembly separated from a duct, according to the present disclosure.

Referring to FIG. 3, the second side 52 of the frame 22 includes a platform 70 that extends upstream (e.g., into the duct 14 away from the interior compartment 18). A support feature 72 is coupled to and extends from the platform 70. The support feature 72 extends further upstream, away from the vanes 24. A guide assembly 74 includes guide features 76A-76D, collectively referred to herein as guide features 76, which extend vertically or transverse to the vanes 24.

The shape of each guide feature 76 maximizes the rotation of the frame 22 within the duct 14. For example, the guide feature 76A includes a beveled edge 78 to minimize interaction between the guide feature 76A and the duct 14 (FIG. 2). The guide features 76B, 76C have rounded edges 80, which minimize interaction between the guide features 76B, 76C and the duct 14 as the frame 22 rotates between the first and second position. Additionally or alternatively, the guide feature 76D, coupled to the support feature 72, is disposed centrally relative to the frame 22 to minimize interaction between the support feature 72 and the guide feature 76D with the duct 14 as the frame 22 rotates within the duct 14. The guide assembly 74 assists in directing air as the frame 22 is adjusted between the first and second positions. Each of the guide features 76 is stationary relative to the frame 22. Accordingly, the guide features 76 are adjusted with the rotation of the frame 22, but not independently from the frame 22. The air register assembly 20 includes the horizontal vanes 24 as well as the vertical guide features 76 for directing or guiding airflow into the interior compartment 18.

The guide feature 76A is coupled to both of the guide features 76B, 76C via coupling bars 82. The guide feature 76A is disposed of vertically above the guide feature 76C, 76D, such that a bottom edge of the guide feature 76A is horizontally aligned with a top edge of each of the guide features 76B, 76C. The guide features 76B, 76C are horizontally aligned with one another. Bottom edges of the guide features 76B, 76C are horizontally aligned with a top edge of the guide feature 76D. Accordingly, the guide features 76B, 76C are vertically offset from the guide feature 76A and the guide feature 76D. The guide features 76B, 76C are coupled to the guide feature 76D via coupling bars 84. The guide feature 76D is vertically aligned with the guide feature 76A. A bottom edge of the guide feature 76D is coupled to the support feature 72. Accordingly, the engagement between the guide feature 76D and the support feature 72 provides a direct connection between the guide assembly 74 and the frame 22.

Figure 4:
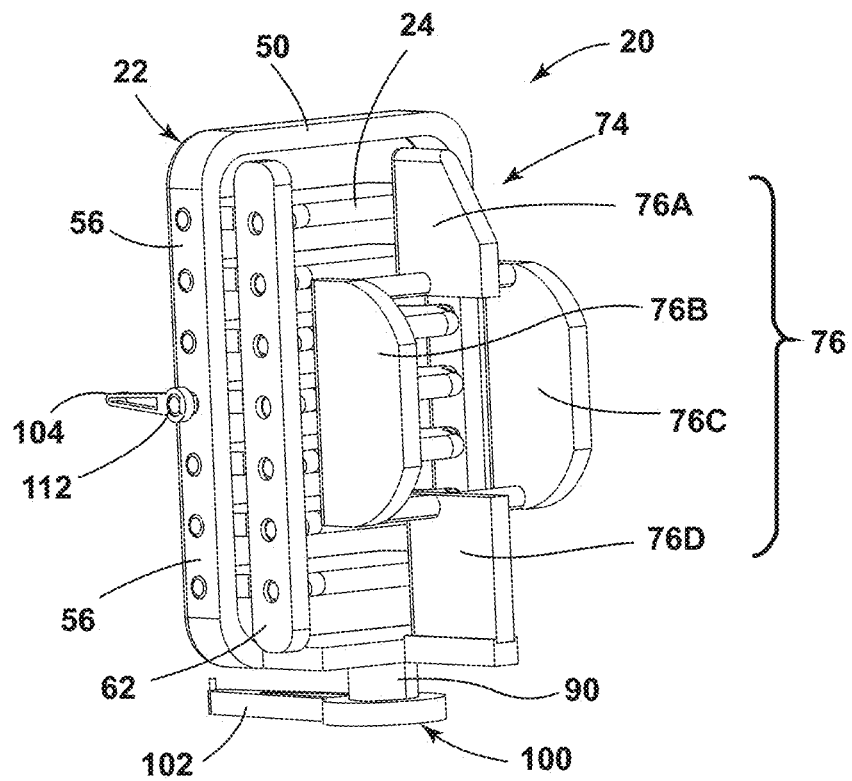
FIG. 4 is a rear perspective view of an air register assembly having a position indicator assembly, according to the present disclosure.
Figure 6:
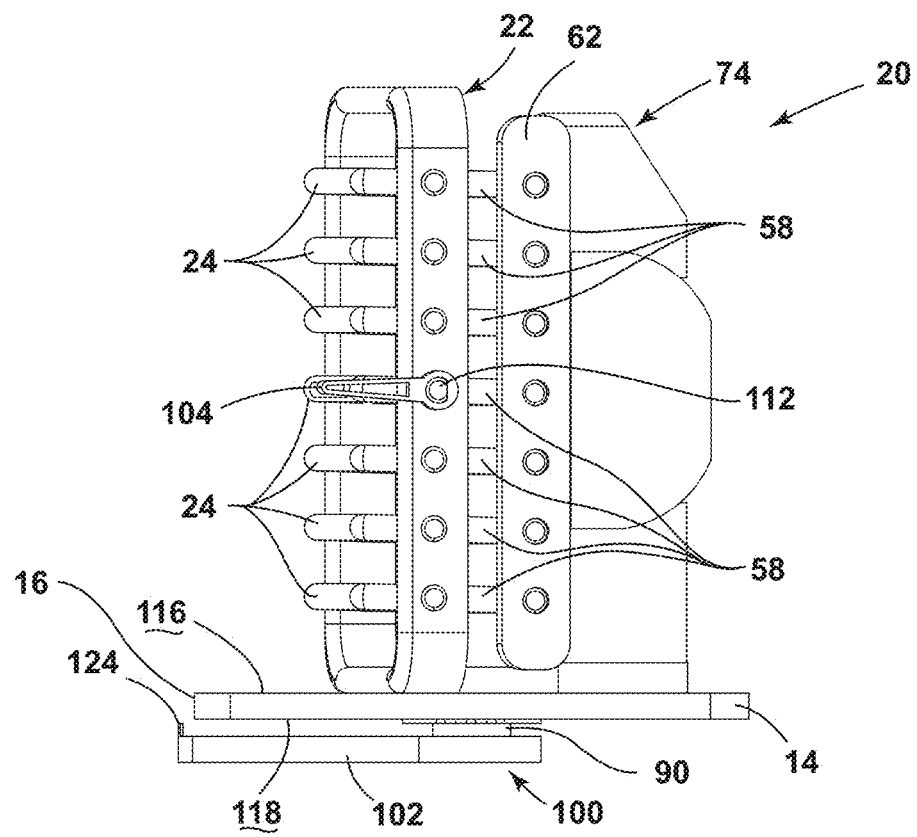
FIG. 6 is a side elevational view of the air register assembly and the duct of FIG. 5.

Referring still to FIG. 3, as well as FIG. 4, the frame 22 includes a shaft 90 that extends from a B-surface 92 of the platform 70. As used herein, the term "A-surface" refers to a surface of any component within the vehicle 12 that is visible or contactable by the passenger within the vehicle 12 when the component is in an assembled state. In comparison, the term "B-surface" refers to a surface of any component within the vehicle 12 that is concealed or not contactable by the passenger within the vehicle 12 when the component is in the assembled state. Accordingly, the shaft 90 extends from a non-contactable, concealed portion of the frame 22. The shaft 90 extends from the second side 52, away from the first side 50, and through the duct 14 (as best illustrated in FIG. 6). The shaft 90 operates as the pivot point allowing the air register assembly 20 to rotate about the vertical axis between the first and second positions. The shaft 90 defines a notch 94 at a distal end thereof, spaced apart from the second side 52.

Figure 5:
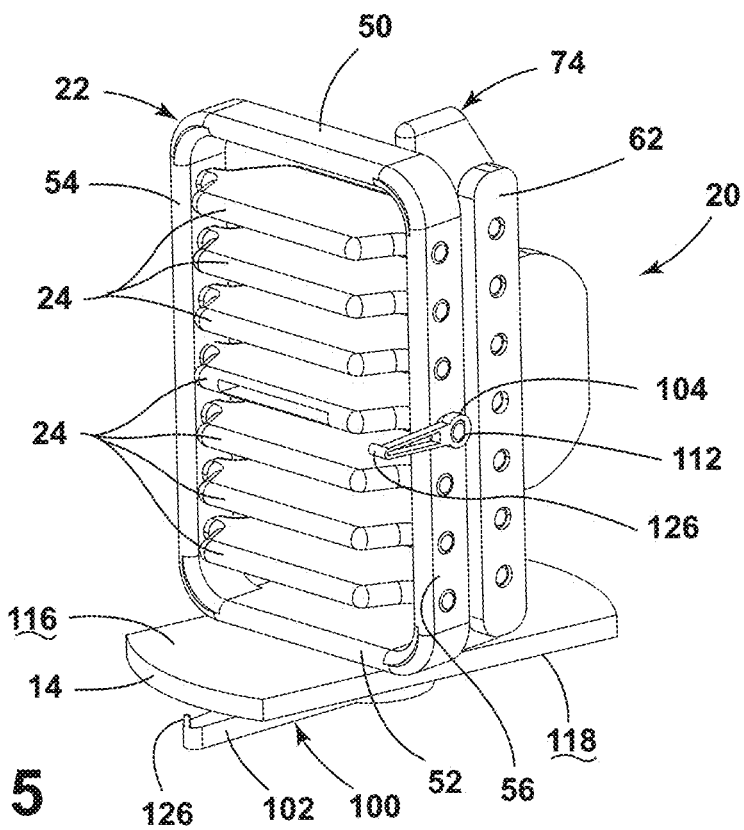
FIG. 5 is a side perspective view of an air register assembly engaging a portion of a duct and having a position indicator assembly, according to the present disclosure.
Figure 7:
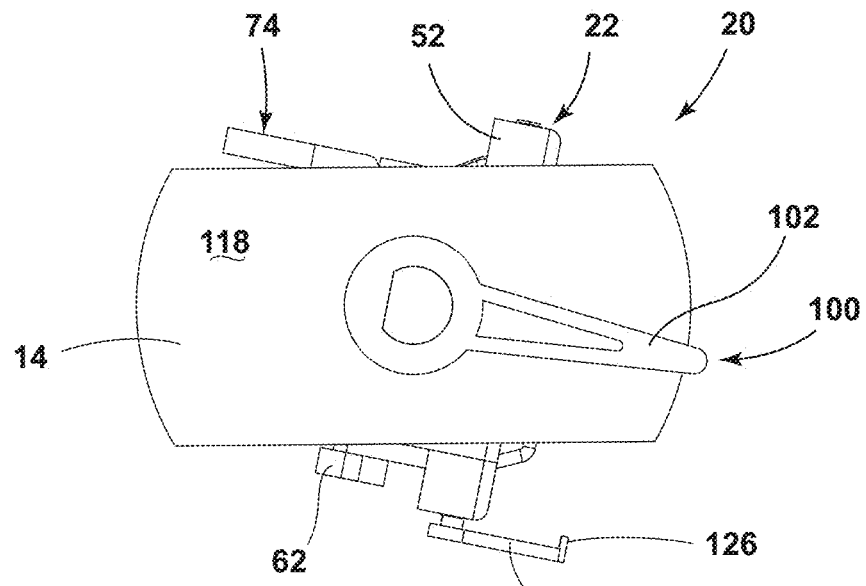
FIG. 7 is a bottom plan view of the air register assembly and the duct of FIG. 5.

Referring to FIG. 4, as well as FIGS. 5-7, the air register assembly 20 includes a position indicator assembly 100 for providing visual feedback for the passenger or user relating to the position of the frame 22 and the vanes 24. The position indicator assembly 100 includes a frame position indicator 102 and a vane position indicator 104. The frame position indicator 102 is generally coupled to the shaft 90 and positioned within the notch 94 (FIG. 3). The notch 94 retains the frame position indicator 102 is the selected position relative to the frame 22.

The vane position indicator 104 is coupled to at least one of the vanes 24. The third and fourth sides 54, 56 of the frame 22 define apertures 110 for receiving the vanes 24 and allowing rotation of the vanes 24 between the first and second angles. Generally, the vanes 24 do not extend beyond outer surfaces of the third and fourth sides 54, 56 of the frame 22. However, one of the vanes 24 includes a projection 112 that extends through the respective aperture 110 to extend beyond the outer surface of the fourth side 56. The vane position indicator 104 is coupled to the projection 112 of the vane 24 adjacent to the outer surface of the frame 22. Generally, the vane 24 coupled to the vane position indicator 104 is centrally located, however, the vane position indicator 104 may be coupled to any of the vanes 24 without departing from the teachings herein.

Referring still to FIGS. 5-7, the frame position indicator 102 and the vane position indicator 104 provide visual feedback to the passenger or user. The frame position indicator 102 and the vane position indicator 104 extend in a downstream direction from the frame 22 toward the interior compartment 18 (FIG. 1). As previously stated, the frame position indicator 102 is coupled to the shaft 90. The second side 52 of the frame 22 is disposed on a first side of the duct 14 proximate an A-surface 116 of the duct 14, and the frame position indicator 102 is disposed on an opposing side of the duct 14 proximate a B-surface 118 of the duct 14. The frame position indicator 102 extends into the interior compartment 18 between the duct 14 and the dashboard 42, or alternatively through an aperture in the dashboard 42, to be visible to the passenger and provide visual feedback of the position of the frame 22 (as best illustrated in FIG. 8).

The frame position indicator 102 includes a protrusion 124 extending vertically from an end thereof. The protrusion 124 extends upward, toward the duct 14. The protrusion 124 may be utilized by the passenger to determine the position of the frame 22 as discussed in further detail herein. The frame position indicator 102 adjusts with the rotation of the frame 22 but is not adjustable independently of the frame 22. Accordingly, as the frame 22 adjusts between the first and second positions, the frame position indicator 102 is also adjusted to provide visual feedback of the position of the frame 22.

The vane position indicator 104 provides visual feedback of the position or angle of the vanes 24. The vane position indicator 104 is disposed adjacent to the fourth side 56 of the frame 22. The vanes 24 are generally positioned within a space defined by the frame 22 and the vane position indicator 104 is disposed outside of that space. The vane position indicator 104 extends in a downstream direction. Generally, the vane position indicator 104 is parallel with the vane 24 having the projection 112. As the vanes 24 are rotated between the first angle and the second angle, the vane position indicator 104 is simultaneously adjusted due to the engagement between the vane position indicator 104 and the projection 112. Additionally or alternatively, the vane position indicator 104 includes a protrusion 126 extending horizontally from an end of the vane position indicator 104. The protrusion 126 extends horizontally toward the vanes 24. The vane position indicator 104 extends into the interior compartment 18 between the frame 22 and the duct 14 to provide a visual indication of the angle of the vanes 24 to the passenger.

Referring still to FIGS. 5-7, as well as FIG. 8, the vane position indicator 104 extends beyond the downstream edge of the vanes 24. The frame position indicator 102 extends beyond the vane position indicator 104 and beyond an edge of the duct 14 defining the outlet 16. In other words, the frame position indicator 102 has a length greater than a length of the vane position indicator 104. Accordingly, each of the frame position indicator 102 and the vane position indicator 104 extend at least partially beyond the dashboard 42 into the interior compartment 18 to be visible to the passenger, while not substantially impinging on the movement of the frame 22.

The position indicator assembly 100 includes a frame measuring feature 130 disposed on the dashboard 42 adjacent to the frame position indicator 102 and a vane measuring feature 132 on the dashboard 42 adjacent to the vane position indicator 104. Each of the frame and vane measuring features 130, 132 are positioned on or defined by an outer surface 134 of the dashboard 42 to be visible to the passenger within the vehicle 12. In the illustrated configuration, the frame and vane measuring features 130, 132 are measuring lines having indicator marks along the measuring line that the frame and position indicators 102, 104 may be aligned with, respectively.

Accordingly, the user can adjust the frame 22 to the desired position by aligning the protrusion 124 of the frame position indicator 102 with a specific indication or mark on the frame measuring feature 130. Similarly, the user may adjust the vanes 24, which consequently adjusts the vane position indicator 104. The user can position the vanes 24 at the desired angle by aligning the protrusion 126 of the vane position indicator 104 with a specific indication or mark of the vane measuring feature 132. The vane position indicator 104 moves closer to and further from the vane measuring feature 132 as the frame 22 rotates between the first and second positions. The vane position indicator 104 and the vane measuring feature 132 may be configured such that the comparison of the vane position indicator 104 to the vane measuring feature 132 may be accomplished when the frame 22 is in any position. The position indicator assembly 100 may provide feedback for adjusting the air register assembly 20 to the desired airflow position, both laterally and vertically, by aligning the frame and vane position indicators 102, 104 with the frame and vane measuring features 130, 132, respectively.

Figure 9:
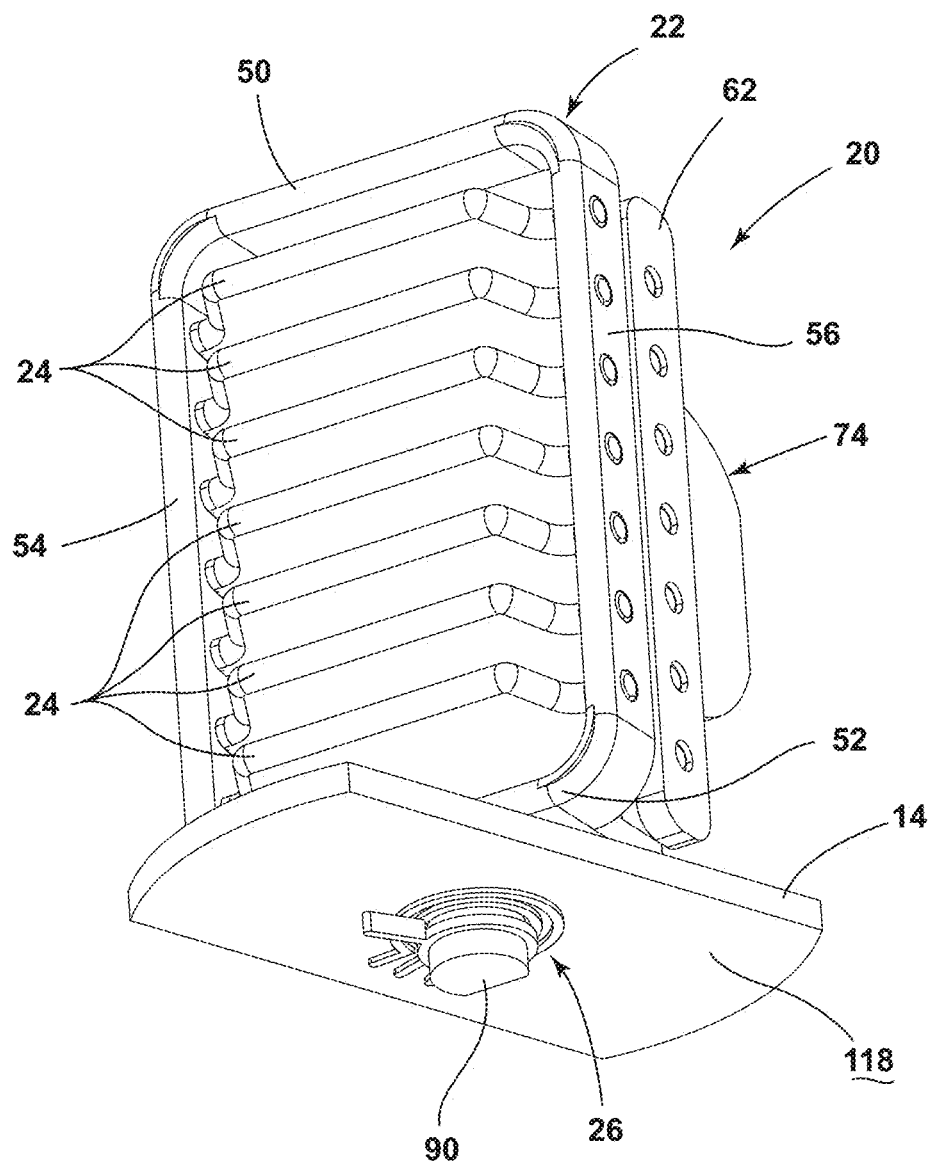
FIG. 9 is a bottom perspective view of a portion of a duct coupled to an air register assembly, according to the present disclosure.
Figure 10:
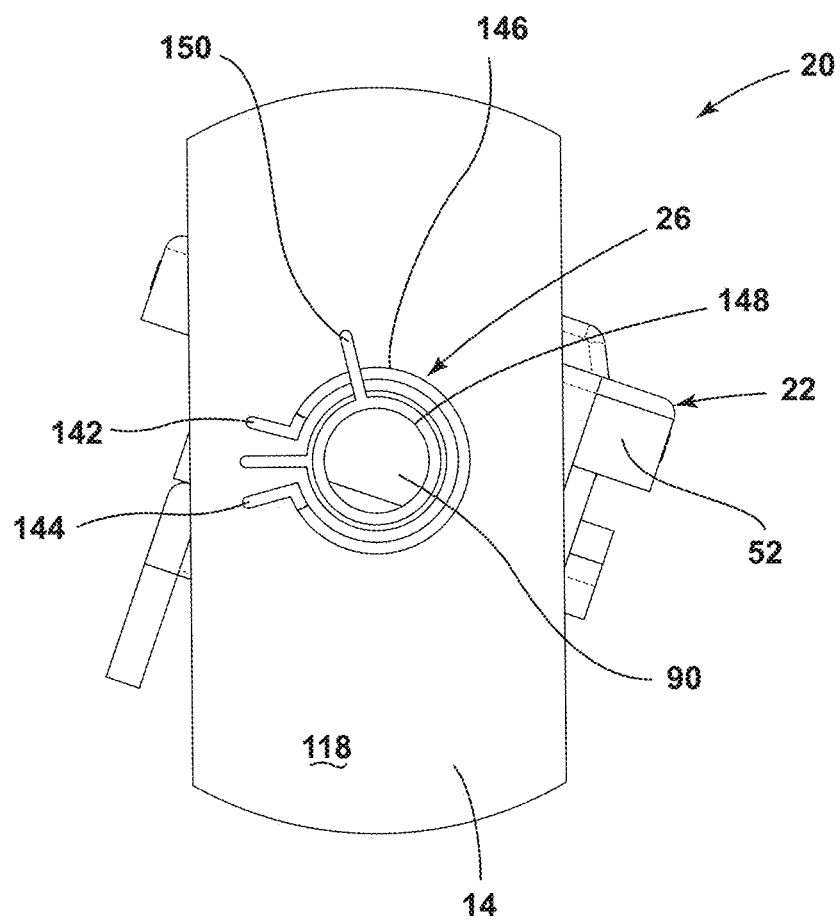
FIG. 10 is a bottom plan view of the duct and the air register assembly of FIG. 9.

Referring to FIGS. 9 and 10, an additional or alternative configuration of the air register assembly 20 is illustrated. The air register assembly 20 may provide visual feedback of the position of the air register assembly 20 to the passenger or user through the variable resistor 26. The variable resistor 26 is operably coupled with at least one of the frame 22 and the duct 14 to sense or measure the position of the frame 22. The variable resistor 26 includes two fixed terminals 142, 144 coupled to the B-surface 118 of the duct 14. A resistive material 146 extends around an aperture 148 in which the shaft 90 extends through. The resistive material 146 is in contact with each of the fixed terminals 142, 144. A movable terminal 150 of the variable resistor 26 is coupled to the shaft 90 proximate the B-surface 118 of the duct 14. The movable terminal 150 is configured to move relative to the resistive material 146 as the frame 22 is adjusted between the first and second positions. Generally, each of the terminals 142, 144, 150 are constructed of metal. The variable resistor 26 is generally configured as a carbon print resistor.

Figure 11:
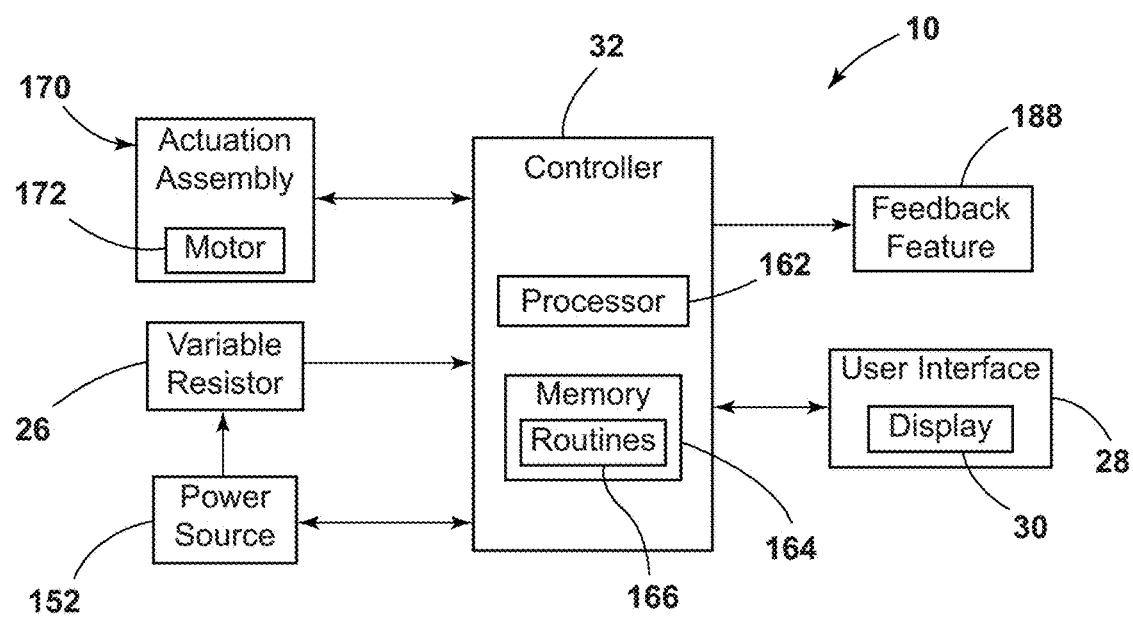
FIG. 11 is a block diagram of an air vent system for a vehicle, according to the present disclosure.

Referring still to FIG. 10, as well as FIG. 11, a power source 152 is in communication with at least the fixed terminal 142 of the variable resistor 26. The power source 152 may be an overall power source 152 for the vehicle 12 or may be a separate power source 152 designated for the air vent system 10. The power source 152 provides a predefined voltage or current to the variable resistor 26. The predefined voltage may be, for example, about 5 V, however power source 152 may provide any predefined voltage without departing from the teachings herein. The position of the movable terminal 150 on the resistive material 146 determines the resistance of the variable resistor 26. The movable terminal 150 operates to divide the resistive material 146 into two portions. One portion extends between the fixed terminal 142 and the movable terminal 150, and the second portion extends between the movable terminal 150 and fixed terminal 144. The fixed terminal 144 determines the output of the variable resistor 26. The length of the second portion between the fixed terminal 144 and the movable terminal 150 is adjusted as the frame 22 is adjusted between the first and second position, which adjusts the resistance or current that is sensed at the fixed terminal 144. The longer the portion of the resistive material 146 between the movable terminal 150 and the fixed terminal 144, the greater the resistance measured by the variable resistor 26. As resistance increases in the variable resistor 26, the current through the circuit decreases and vice versa.

The resistance sensed by the variable resistor 26 in comparison with the predefined voltage may correspond with the position of the air register assembly 20. The air vent system 10 generally includes the controller 32 communicatively coupled to the variable resistor 26. The controller 32 includes a processor 162, memory 164, and other control circuitry. Instructions or routines 166 are stored within the memory 164 and executable by the processor 162. The controller 32 may be part of a climate control system of the vehicle 12 or may be a designated controller 32 for the air vent system 10. The controller 32 sends a signal to the power source 152 to provide the predefined voltage to the variable resistor 26. When the power source 152 provides the predefined voltage to the variable resistor 26, the variable resistor 26 measures the resistance at the fixed terminal 144 and provides a signal to the controller 32.

Generally, the variable resistor 26 provides an analog signal to the controller 32. The controller 32 includes one or more routines 166 for converting the analog signal from the variable resistor 26 to a digital signal. The digital signal corresponds to the position of the frame 22 between the first and second position (e.g., including the first and second position and all intermediate positions). Accordingly, the air vent system 10 may determine the current position of the frame 22 utilizing the variable resistor 26. The controller 32 may communicate position information (e.g., the digital signal corresponding to the position) to the user interface 28, and the user interface 28 may convey the position information of the air register assembly 20 via the display 30. Displaying the position information allows the user to receive visual feedback of the position that may provide a personalized or optimized airflow within the vehicle 12. The passenger or user may view the position information on the display 30 and adjust the air register assembly 20 to the same position in the future. It is also contemplated that the variable resistor 26 or an additional variable resistor 26 may operate in conjunction with the vanes 24 to determine the angle of the vanes 24. In such configurations, angle information corresponding to the angle of the vanes 24 may be displayed on the user interface 28.

Figure 12:
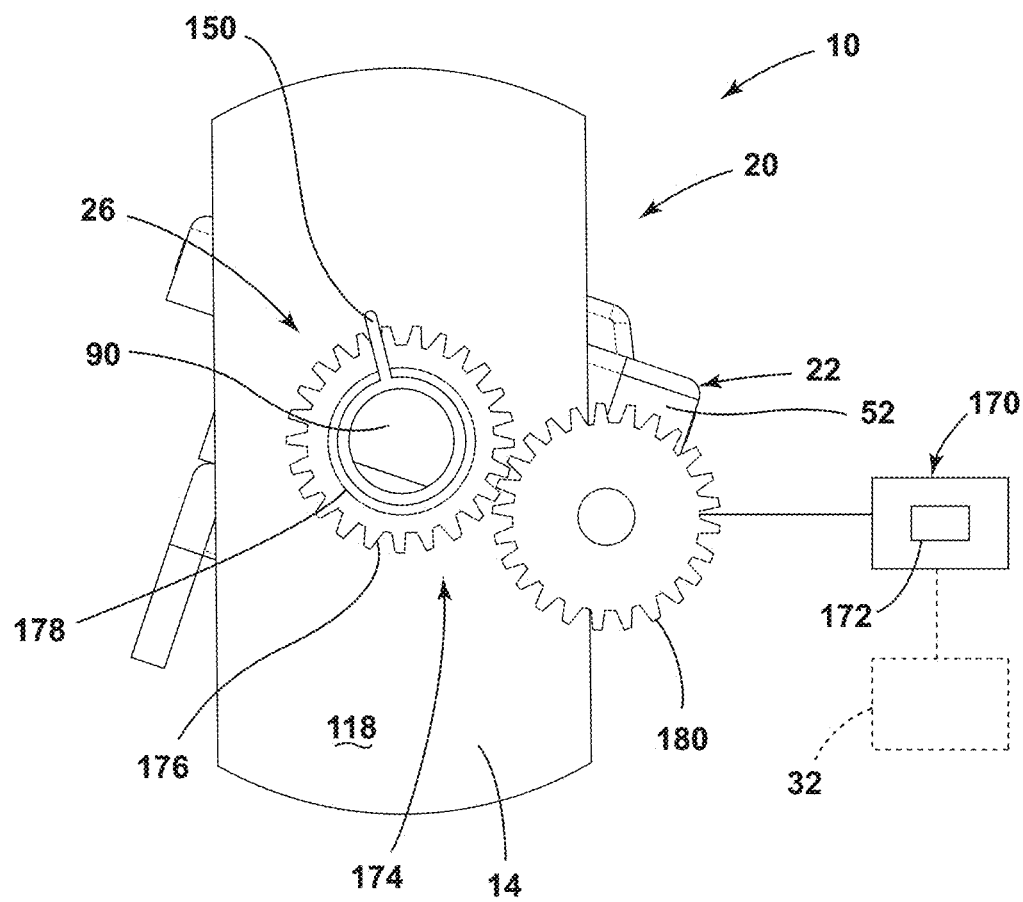
FIG. 12 is a bottom schematic view of an actuation assembly engaging gears coupled to an air register assembly, according to the present disclosure.

Referring still to FIG. 11, as well as FIG. 12, the air vent system 10 may include an actuation assembly 170 communicatively coupled with the controller 32 and operably coupled with the air register assembly 20. The actuation assembly 170 includes a motor 172 configured to drive gears, rack and pinion assemblies, or other actuators. The actuation assembly 170 is in communication with a gear assembly 174 coupled to the air register assembly 20. A first gear 176 of the gear assembly 174 is coupled to an insulating cover 178 disposed at least partially over the variable resistor 26. The insulating cover 178 may also be coupled to the shaft 90 of the frame 22. The first gear 176 is operably coupled to at least one of the shaft 90 and the insulating cover 178 and engages a second gear 180 of the gear assembly 174.

The controller 32 may automatically adjust the position of the air register assembly 20 through the actuation assembly 170 and the gear assembly 174. Accordingly, the controller 32 may determine the position of the air register assembly 20 utilizing the variable resistor 26 and may utilize the actuation assembly 170 and the gear assembly 174 to adjust the air register assembly 20 to a different selected position, as detected or sensed by the variable resistor 26. The newly selected position may be a predefined position defined by user settings stored within the memory 164 of the controller or may be a user selection input via the user interface 28. As such, the air vent system 10 may automatically detect the position of the frame 22 and adjust the position of the frame 22 using the variable resistor 26. It is also contemplated that the actuation assembly 170 is operably coupled to the vanes 24 without departing from the teachings herein.

In operation, the power source 152 provides the predefined voltage to the variable resistor 26 upon activation by the controller 32. The variable resistor 26 measures the resistance and sends the analog signal corresponding with the resistance to the controller 32. The controller 32 receives the analog signal and converts the analog signal to the digital signal corresponding to the position of the air register assembly 20. The controller 32 communicates the digital signal (e.g., the position information) to the user interface 28 to be displayed to the passenger on the display 30. The passenger may note the position of the air register assembly 20 on the display 30. Additionally or alternatively, if the position information is not the position desired by the passenger, the passenger may select a new position. The controller 32 may receive the new position information and activate the actuation assembly 170 to adjust the air register assembly 20 to the new position by engaging the gear assembly 174. The controller 32 may monitor the resistance sensed by the variable resistor 26 to determine when the air register assembly 20 is in the newly selected position. The new position information may be displayed on the user interface 28 to provide visual feedback of the adjustment.

Figure 13:
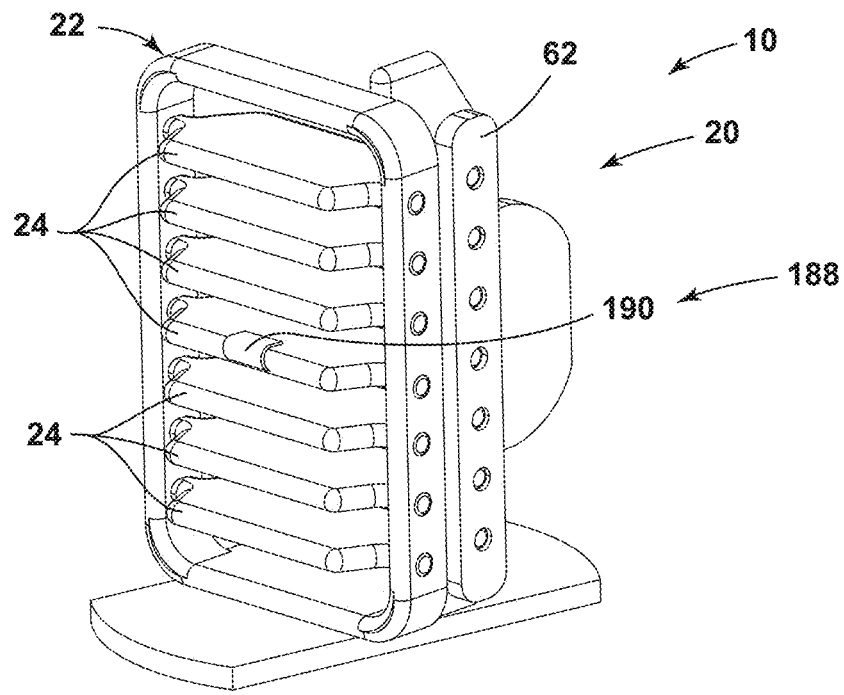
FIG. 13 is a side perspective view of an air register assembly having an indicator light, according to the present disclosure.

Referring to FIG. 13, the air register assembly 20 may include a feedback feature 188 that is used in combination with or independently of at least one of the position indicator assembly 100 and the variable resistor 26. The feedback feature 188 may include an indicator light 190 coupled to or integrally formed with at least one of the vanes 24. The indicator light 190 may be illuminated by the controller 32 when the air register assembly 20 is in the selected position. The selected position may include at least one of the position of the frame 22 and the angle of the vanes 24. Generally, the selected position optimizes the airflow condition for the passenger. For example, the selected position may be an optimized airflow directly on the passenger. The indicator light 190 may illuminate when the airflow is directed to the passenger on the seating assembly 40. Alternatively, if the user preferences stored within the memory 164 indicate that the passenger prefers airflow adjacent to the seating assembly 40, the indicator light 190 is illuminated when the airflow is directed at the user defined position adjacent to the seating assembly 40.

The indicator light 190 provides feedback to the passenger to confirm the selected position of the air register assembly 20 without viewing the user interface 28 or another indicator on the dashboard 42. The indicator light 190 may be utilized with the air register assembly 20 illustrated in FIGS. 2-8, as well as the air register assembly 20 illustrated in FIGS. 9-12 without departing from the teachings herein. For example, the indicator light 190 is illuminated by the controller 32 when the actuation assembly 170 adjusts the air register assembly 20 to the newly selected position, which is sensed by the variable resistor 26 and confirmed by the controller 32. The controller 32 may sense the position of the air register assembly 20 through the variable resistor 26 or another sensor or user input to confirm the selected position and activate the indicator light 190.

Figure 14:
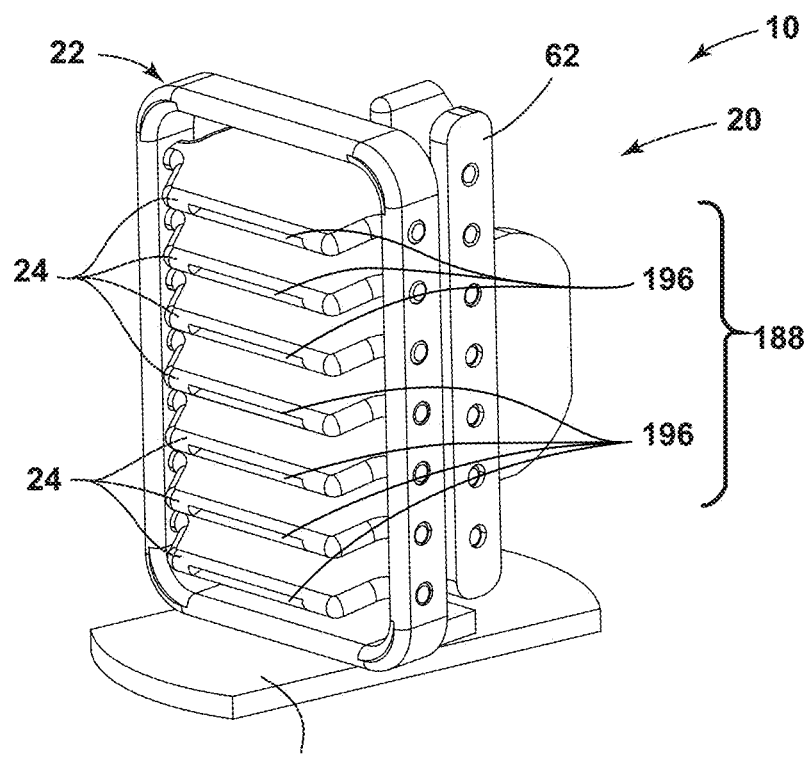
FIG. 14 is a side perspective view of an air register assembly having multiple indicator lights, according to the present disclosure.

Referring to FIG. 14, the feedback feature 188 may include indicator lights 196 coupled to or integrally formed with each vane 24 (e.g., one indicator light 196 per vane 24). The indicator lights 196 may illuminate when the vanes 24 are at a predefined angle. Generally, the predefined angle is an open position allowing airflow through the air register assembly 20. Additionally or alternatively, the indicator lights 196 may illuminate when the vehicle 12 is started. When integrally formed with the vanes 24, the illuminated indicator lights 196 may be visible to the passenger when the vanes 24 are in the open position and may not be visible (e.g., may be obscured) when the vanes 24 are in a closed position that prevents airflow through the air register assembly 20. Accordingly, indicator lights 196 provide feedback on whether air is traveling through the air register assembly 20. The indicator lights 196 may be utilized with the configuration of the air register assembly 20 illustrated in FIGS. 2-8, as well as the air register assembly 20 illustrated in FIGS. 9-12. Further, it is contemplated that the indicator light 196 may be used in combination with or independently of the indicator light 190.

Referring to FIGS. 1-14, the air register assembly 20 provides for directed airflow into the interior compartment 18 of the vehicle 12. The vanes 24 vertically adjust the airflow, while the frame 22 horizontally adjusts the airflow. The air register assembly 20 may include the position indicator assembly 100 to provide visual feedback to the passenger of the position of the vanes 24 and the frame 22. This configuration allows the passenger or user to easily determine the position of the frame 22 and the vanes 24 that provides the optimal or desired airflow into the interior compartment 18. Additionally or alternatively, the air register assembly 20 may include the variable resistor 26 that senses the position of the frame 22. The position of the frame 22 may be determined by the controller 32 and displayed to the passenger via the user interface 28. This configuration allows the passenger to visually confirm the position that provides the optimized or desired airflow through the air register assembly 20. It is contemplated that the air register assembly 20 may include one or both of the position indicator assembly 100 and the variable resistor 26. Additionally or alternatively, the air register assembly 20 may be in communication with the actuation assembly 170 to automatically adjust the position of at least one of the vanes 24 and the frame 22. Within the vehicle 12, various features (e.g., steering wheel, etc.) may hinder airflow from the air register assemblies 20, and the air vent system 10 allows the passenger to adjust the air register assemblies 20 to maximize the airflow to provide an optimized experience.

Use of the present device may provide for a variety of advantages. For example, the air register assembly 20 may direct air into the interior compartment 18. Additionally, the air register assembly 20 may include the position indicator assembly 100, which provides visual feedback of the angle of the vanes 24 and the position of the frame 22. Also, the position indicator assembly 100 allows the user to compare the frame position indicator 102 to the frame measuring feature 130 and the vane position indicator 104 to the vane measuring feature 132. The user can then note the measurement and easily return the air register assembly 20 to the selected position. Further, the air register assembly 20 may include the variable resistor 26 operably coupled thereto. Additionally, the variable resistor 26 may sense the position of the frame 22 and communicate the position to the controller 32. Also, the controller 32 may interpret the signal from the variable resistor 26 and display the position information relating to the position of air register assembly 20 on the user interface 28. Further, the controller 32 may activate the actuation assembly 170 to automatically adjust the position of the frame 22 and/or the vanes 24.

Moreover, the air register assembly 20 may include the feedback feature 188. The air register assembly 20 may include the indicator light 190, which may illuminate when the air register assembly 20 is in the selected position. Further, the air register assembly 20 may include the indicator lights 196, which may provide visual feedback to the passengers that the air register assembly 20 is allowing airflow to travel through the air registers assembly 20 and into the interior compartment 18. Additionally, the air register assembly 20 with the various features providing visual feedback allows the passenger to maximize comfort and internal temperature within the vehicle 12. Additional benefits or advantages may be realized and/or achieved.

According to various examples, a vehicle air vent system includes a duct defining an outlet that directs air into an interior compartment. An air register assembly is operably coupled to the duct proximate to the outlet. The air register assembly includes a frame. A vane is rotatably coupled to the frame. A variable resistor is operably coupled to the frame. A user interface has a display. A controller is communicatively coupled to the user interface and the variable resistor. The controller receives a signal from the variable resistor and determines a position of the air register assembly in response to the signal. Embodiments of the present disclosure may include one or a combination of the following features:

- a power source operably coupled to the variable resistor, wherein the power source provides a predefined current to the variable resistor;
- the controller communicates the position of the air register assembly to the user interface, wherein the user interface displays the position;
- the frame includes a shaft that extends through the duct, wherein the shaft is coupled to a movable terminal of the variable resistor;
- an indicator light coupled to the vane, wherein the indicator light is activated by the controller when the vane is at a predefined angle;
- an indicator light integrally formed with the vane, wherein the indicator light is visible when the vane is disposed at a first angle and obscured when the vane is disposed at a second angle;
- the variable resistor is disposed on a first side of the duct and the vane is disposed on a second side of the duct;
- at least a portion of the variable resistor is coupled to a B-surface of the duct; and
- the variable resistor is a carbon print resistor.

According to various examples, an air register assembly includes a frame having a first side and a second side opposing the first side. The frame is operable between a first position and a second position. At least one vane extends between a third side of the frame and a fourth side of the frame. The third and fourth sides extend between the first and second sides. A shaft is coupled to the second side of the frame. The shaft extends away from the first side of the frame. A variable resistor is operably coupled to the frame. A movable terminal of the variable resistor is coupled to the shaft. A current measured by the variable resistor is adjusted as the frame moves between the first and second positions. Embodiments of the present disclosure may include one or a combination of the following features:

- a controller communicatively coupled to the variable resistor, wherein the controller receives a signal from the variable resistor and determines a position of the frame between the first and second positions;
- a guide feature disposed proximate to the at least one vane, wherein the guide feature is coupled to a support feature, and wherein the support feature is coupled to the second side of the frame;
- the at least one vane includes a plurality of vanes, wherein each vane includes an indicator light that illuminates when the plurality of vanes is disposed at a predefined angle; and
- the variable resistor is a carbon print resistor.

According to various examples, an air register assembly includes a frame having a first side and a second side. The frame is operable between a first position and a second position. A vane is rotatably coupled to a third side of the frame and a fourth side of the frame. The vane includes a projection that extends through the frame. A vane position indicator is coupled to the projection. The vane position indicator rotates within rotation of the vane. A frame position indicator is coupled to the frame. The frame position indicator adjusts with the frame as the frame moves between the first and second positions. Embodiments of the present disclosure may include one or a combination of the following features:

- an indicator light coupled to the vane, wherein the indicator light illuminates when the vane is at a predefined angle;
- the vane position indicator extends beyond an edge of the vane, and wherein the frame position indicator has a length greater than a length of the vane position indicator;
- a shaft extending from the second side of the frame, wherein the frame position indicator is coupled to the shaft;
- a duct, wherein the shaft extends through the duct, and wherein the frame position indicator is disposed on a first side of the duct and the second side of the frame is disposed on a second side of the duct; and
- a variable resistor operably coupled to the frame.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine, or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle air vent system, comprising:
    a duct defining an outlet that directs air into an interior compartment;
    an air register assembly operably coupled to the duct proximate to the outlet, wherein the air register assembly comprises:
        a frame;
        a vane rotatably coupled to the frame;
        a guide assembly coupled to the frame and extending upstream from the frame proximate to the vane, wherein the guide assembly includes guide features fixed to the frame, and wherein the guide features include a first guide feature disposed centrally to the frame and fixed to a bottom side of the frame via a support feature and a second guide feature disposed centrally to the frame and proximate a top side of the frame, wherein the first guide feature is spaced from and operably coupled to the second guide feature and each of the first guide feature and the second guide feature is configured to rotate with the frame;
        a vane position indicator disposed on an opposing side of the frame relative to the vane, wherein the vane position indicator rotates with rotation of the vane, and wherein the vane position indicator includes a body that tapers towards a protrusion at an end of the vane position indicator, the protrusion extending towards the vane;
        a variable resistor operably coupled to the frame; and
        an indicator light coupled to a downstream edge of the vane;
    a user interface having a display; and
    a controller communicatively coupled to the user interface and the variable resistor, wherein the controller receives a signal from the variable resistor and determines a position of the air register assembly in response to the signal, wherein the indicator light is activated by the controller when the vane is disposed at an angle that directs an airflow at a user-defined position.

2. The vehicle air vent system of claim 1, further comprising:
    a power source operably coupled to the variable resistor, wherein the power source provides a predefined current to the variable resistor.

3. The vehicle air vent system of claim 1, wherein the controller communicates the position of the air register assembly to the user interface, and wherein the user interface displays the position.

4. The vehicle air vent system of claim 1, wherein the frame includes a shaft that extends through the duct, and wherein the shaft is coupled to a movable terminal of the variable resistor.

5. The vehicle air vent system of claim 1, wherein the variable resistor is disposed on a first side of the duct and the vane is disposed on a second side of the duct.

6. The vehicle air vent system of claim 1, wherein at least a portion of the variable resistor is coupled to a B-surface of the duct, the B-surface opposing an A-surface of the duct, wherein the A-surface is proximate the frame.

7. The vehicle air vent system of claim 1, wherein the variable resistor is a carbon print resistor.

8. The vehicle air vent system of claim 1, further comprising:
    a shaft that extends from the bottom side of the frame, through the duct, and beyond a B-surface of the duct, the shaft being configured to rotate with the frame about a central rotational axis defined by the shaft, and wherein the variable resistor includes a movable terminal that is coupled to the shaft and a resistive material that is coupled to the B-surface of the duct adjacent to the central rotational axis.

9. An air register assembly, comprising:
a frame having a top first side and a bottom second side opposing the top first side, wherein the frame is operable between a first position and a second position;
at least one vane extending between a third side of the frame and a fourth side of the frame, wherein the third and fourth sides extend between the top first side and the bottom second side;
a shaft coupled to the bottom second side of the frame, wherein the shaft extends away from the top first side of the frame;
a support feature extending upstream from the bottom second side of the frame;
a guide assembly coupled to the support feature and disposed proximate to the at least one vane, wherein the guide assembly extends upstream from the frame proximate to the at least one vane, the guide assembly including a first guide feature disposed centrally to the frame and fixed to the bottom second side of the frame via the support feature and a second guide feature disposed centrally to the frame and proximate the top first side of the frame, wherein the first guide feature is spaced from and operably coupled to the second guide feature and each of the first guide feature and the second guide feature is configured to rotate with the frame; and
a variable resistor operably coupled to the frame, wherein a movable terminal of the variable resistor is coupled to the shaft, and wherein a current measured by the variable resistor is adjusted as the frame moves between the first and second positions.

10. The air register assembly of claim 9, further comprising:
a controller communicatively coupled to the variable resistor, wherein the controller receives a signal from the variable resistor and determines a position of the frame between the first and second positions.

11. The air register assembly of claim 9, wherein the at least one vane includes a plurality of vanes, and wherein each vane includes an indicator light that illuminates when the plurality of vanes is disposed at a predefined angle.

12. The air register assembly of claim 9, wherein the variable resistor is a carbon print resistor.

13. An air register assembly, comprising:
a frame having a first side and a second side, wherein the frame is operable between a first position and a second position;
a vane rotatably coupled to a third side of the frame and a fourth side of the frame, wherein the vane includes a projection that extends through the third side of the frame;
a vane position indicator coupled to the projection and disposed on an opposing side of the third side of the frame relative to the vane, wherein the vane position indicator rotates with rotation of the vane, and wherein the vane position indicator includes a body that tapers towards a protrusion at an end of the vane position indicator, the protrusion extending towards the vane;
a frame position indicator coupled to the frame, wherein the frame position indicator adjusts with the frame as the frame moves between the first and second positions, and wherein the frame position indicator includes a body that tapers towards a protrusion at an end of the frame position indicator, the protrusion extending towards the vane; and
a guide assembly coupled to the frame and extending upstream from the frame proximate to the vane, wherein the guide assembly includes guide features fixed to the frame, and wherein the guide features include a first guide feature disposed centrally to the frame and fixed to the second side of the frame via a support feature and a second guide feature disposed centrally to the frame and proximate the first side of the frame, wherein the first guide feature is spaced from and operably coupled to the second guide feature and each of the first guide feature and the second guide feature is configured to rotate with the frame.

14. The air register assembly of claim 13, further comprising:
an indicator light coupled to the vane, wherein the indicator light illuminates when the vane is at a predefined angle.

15. The air register assembly of claim 13, wherein the vane position indicator extends beyond an edge of the vane, and wherein the frame position indicator has a length greater than a length of the vane position indicator.

16. The air register assembly of claim 13, further comprising:
a shaft extending from the second side of the frame, wherein the frame position indicator is coupled to the shaft.

17. The air register assembly of claim 16, further comprising:
a duct, wherein the shaft extends through the duct, and wherein the frame position indicator is disposed on a first side of the duct and the second side of the frame is disposed on a second side of the duct.

18. The air register assembly of claim 13, further comprising:
a variable resistor operably coupled to the frame.

19. The air register assembly of claim 9, wherein a coupling bar couples the first guide feature to the second guide feature.

20. The air register assembly of claim 13, wherein the frame position indicator is spaced apart from the frame by a duct.

* * * * *